July 8, 1947.　　　F. T. COURT　　　2,423,485
POWER LIFT OF THE HYDRAULIC TYPE
Filed March 11, 1942　　　5 Sheets-Sheet 1

INVENTOR
FRANK T. COURT
BY
ATTORNEYS

July 8, 1947.　　　F. T. COURT　　　2,423,485
POWER LIFT OF THE HYDRAULIC TYPE
Filed March 11, 1942　　　5 Sheets-Sheet 4

INVENTOR
FRANK T. COURT
BY
ATTORNEYS

July 8, 1947.  F. T. COURT  2,423,485
POWER LIFT OF THE HYDRAULIC TYPE
Filed March 11, 1942  5 Sheets-Sheet 5

FIG. 10

INVENTOR
FRANK T. COURT
BY
ATTORNEYS

Patented July 8, 1947

2,423,485

UNITED STATES PATENT OFFICE 2,423,485

POWER LIFT OF THE HYDRAULIC TYPE

Frank T. Court, Moline, Ill., assignor to Deere & Company, Moline, Ill., a corporation of Illinois Application March 11, 1942, Serial No. 434,256

17 Claims. (Cl. 60—52)

1

The present invention relates generally to agricultural implements and more particularly to a hydraulic power lift control system for agricultural implements and the like.

The object and general nature of the present invention is the provision of a hydraulic power lift for the ground working tool or other operating unit of an agricultural implement, in which is embodied a control of the working ram unit with associated automatic valve mechanism arranged so that when a given or adjustable quantity of fluid has been forced into the ram cylinder, the valve mechanism is automatically operated so as to terminate further raising, or extension of the ram unit, while locking the ram unit in extended or partially extended relation.

It is a further feature of this invention to provide an arrangement of this kind in which manually operable means is provided and which may be moved to various positions and so connected with the hydraulic system that the ram unit is automatically shifted a corresponding amount. Further, it is a feature of this invention to provide a part that can be manually set in the position of adjustment in which the ram unit is operated until the transfer of a given amount of fluid has taken place, whereupon the valve mechanism is automatically shifted back into a neutral position, terminating further adjustment of the tool and holding the latter in that position.

These and other objects and advantages of the present invention will be apparent to those skilled in the art after a consideration of the following detailed description, taken in conjunction with the accompanying drawings.

In the drawings:

Figure 8 is a side view of the upper portion of

2 the unit shown in Figure 6, illustrating the frictionally held adjustable depth control, Figure 8 being a view taken generally along the line 8—8 of Figure 7;

Figure 9 shows a modified form of the present invention, in which the pump and control unit may be separately mounted at any suitable point on the tractor or implement, as desired;

Referring now to the drawings, the reference numeral 1 indicates in its entirety the metering cylinder or chamber and pump unit in which the principles of the present invention have been incorporated. The unit 1 is mounted on the governor housing 2 of a tractor indicated in its entirety by the reference numeral 3, and the unit 1 controls the flow of oil or other fluid under pressure to and from a ram unit, which is indicated in its entirety by the reference numeral 5. The ram unit 5 includes a cylinder 6 and a piston 7. The ram unit 5 is carried by a bracket 9 fixed to the axle 11 of the tractor, and the piston 7 at its rear end is connected to an arm 12 that is secured to a rock shaft 13. The latter also has an arm 14 extending vertically and is connected by a lift pipe 15 or other means with a ground working tool or other operating unit mounted on or connected with the tractor 3. The governor housing encloses suitable mechanism, such as a shaft or the like (not shown), by which two gears 17 that comprise the principal part of a fluid pump 18 are driven. Preferably, the pump 18 is arranged to receive the oil from a reservoir and/or metering chamber forming a part of the hydraulic unit 1, and the discharge of the pump 18 is also directed through and controlled by parts in the unit 1, as will now be described.

Figures 1, 3:
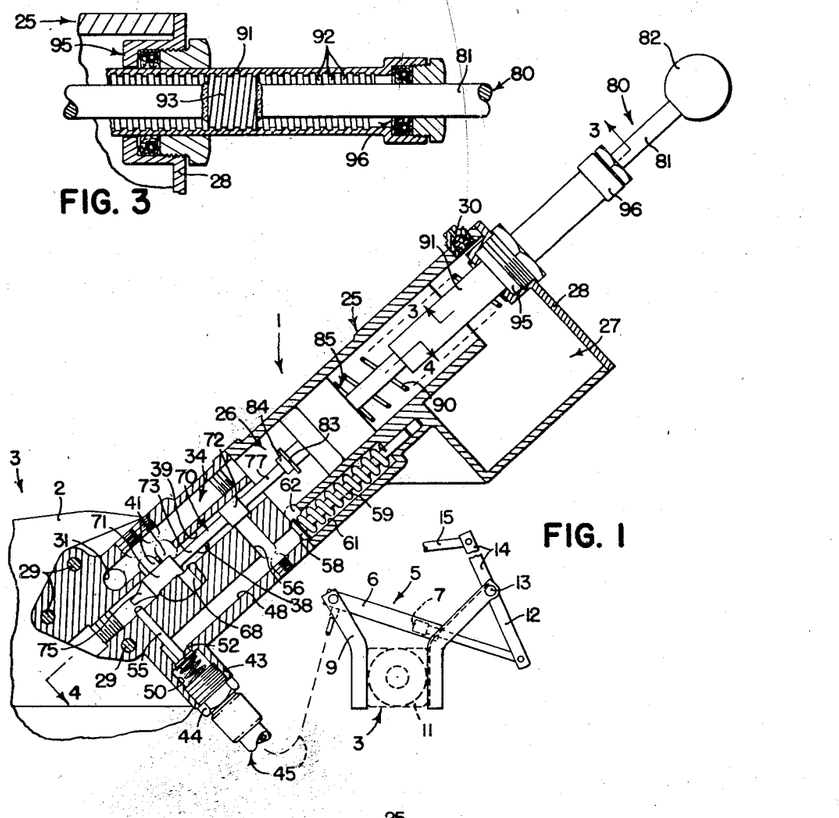
Figure 1 is a sectional view of a tractor mounted hydraulic power lift control unit, in which the implement controlling ram is shown diagrammatically.
Figure 3 is a fragmentary sectional view taken along the line 3—3 of Figure 1.
Figures 2, 5:
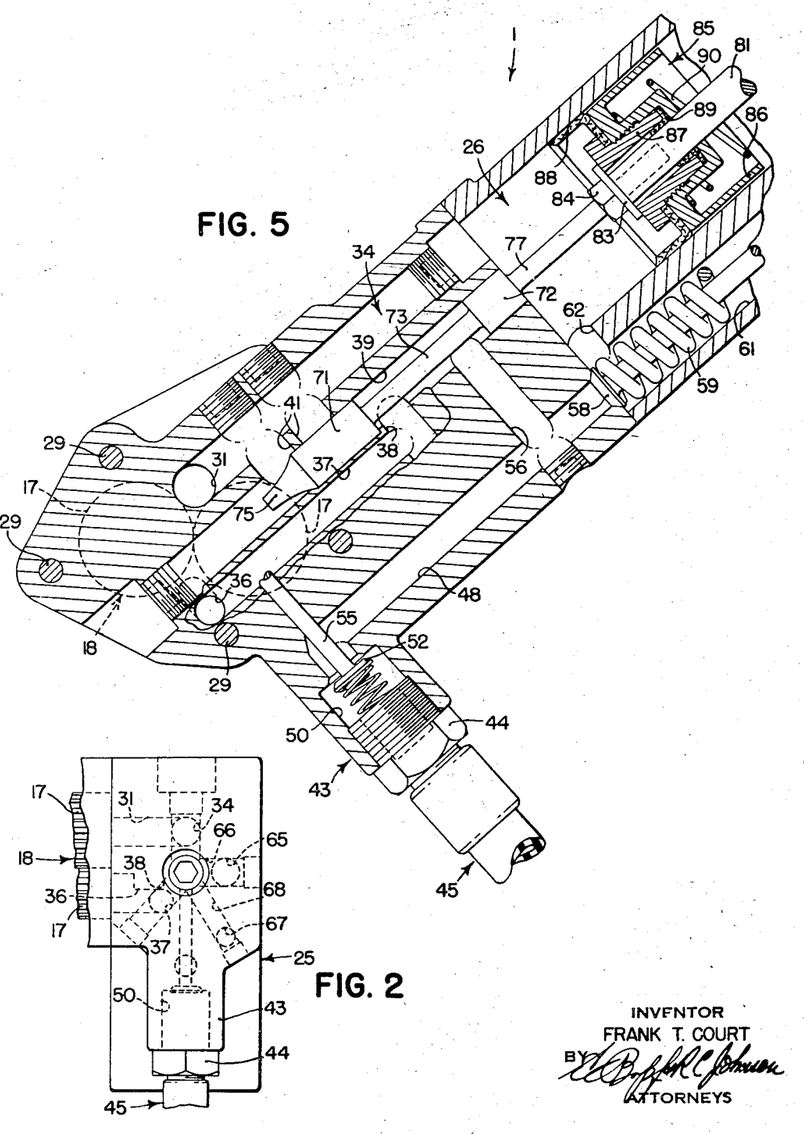
Figure 2 is an end view of the hydraulic power lift control unit shown in Figure 1.
Figure 5 is an enlarged view of the valve mechanism, showing the valve in its raising position.
Figure 4:
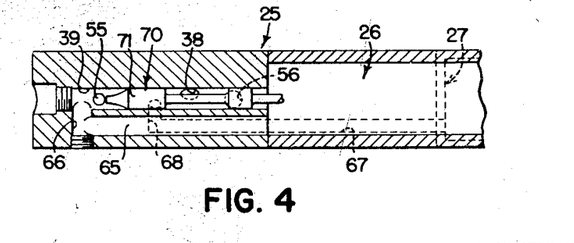
Figure 4 is a sectional view taken along the line 4—4 of Figure 1.

The hydraulic device 1 comprises an enclosing and supporting casing or housing 25 which, as indicated above, includes a metering cylinder 26 and a reservoir 27, the latter being closed by a cover plate 28. The lower and forwardmost portion of the unit 25 is formed to serve as a part of the pump 18, being provided with openings receiving three attaching bolts or cap screws 29 by which the casing 25 is held in place with a bore 31 formed therein, establishing communication between an inlet chamber 34 in the casing 25 and the intake or low pressure side of the pump 18. The outlet or high pressure side of the pump 18 connects with a bore 36 which joins a passageway 37 that is formed in the lower portion of the casing 25 and opens through a short cross bore 38 into a valve chamber 39. The high pressure duct 37 and associated parts are best shown in Figure 5. The valve chamber 39 communicates with the inlet chamber 34 through a pair of closely spaced openings 41, as best shown in Figure 1. The lower end of the casing is provided with an outlet 43 to which a hose fitting 44 is connected. The fitting 44 forms a part of a hose 45 that leads to the ram unit 5 (Figure 1) described above. Formed in the casing 25 is an outlet passage 48 which at its outer end communicates with the outlet chamber 50 in the casing part 43 under the control of a valve 52 which opens outwardly but prevents flow of fluid inwardly, serving thereby as a check valve. The valve 52 is normally held in seated position by a spring 54 but may open outwardly when the pressure in the duct 48 exceeds the pressure in the chamber 54 and hose 45, and also when pressure is applied to the inner end of the stem 55 of the valve 52. The discharge duct 48 communicates with the valve chamber 39 through a cross bore 56, and the end of the duct 48 is formed as a valve seat which receives an emergency high pressure relief valve 58 that is normally pressed to the seat by a relatively heavy spring 59. The chamber 61 in which the spring and valve 58 are disposed opens into the metering chamber 26 through a port 62. The metering chamber 26 also communicates with a bore 65 (Figure 4) that extends downwardly through the housing 25 alongside the valve chamber 39 and which connects through a cross bore 66 with the lower or forward end of the valve chamber 39, ahead of the valve therein. Also, as best shown in Figure 4, the reservoir 27 in the housing 25 is in communication with the valve chamber 39 through a duct 67 and a cross bore 68 that leads into the central portion of the valve chamber 39.

The valve that is disposed in the valve chamber 39 is of the cylinder or plunger type and is indicated in its entirety by the reference numeral 70. The valve 70, as best shown in Figure 5, is formed with two plunger or cylindrical sections 71 and 72 connected by a narrow shank 73. The lower end of the cylindrical section 71 is formed with a cam end 75 of generally curved configuration which cooperates with the stem 55 of the lowering valve 52. The valve chamber 39 opens at its upper end directly into the metering chamber 26, and the valve 70 includes a stem section 77 that extends upwardly into the metering chamber 26.

An operating member, indicated in its entirety by the reference numeral 80, is connected with the valve 70 and comprises an elongated stem 81 to the upper end of which a knob 82 is connected and the lower end of which is threaded to receive the upper threaded end of the valve stem 77. A stop washer 83 is disposed between the lower end of the operating member 80 and a lock nut 84 that secures the valve 70 to the member 80 forming, in effect, a single part. A free piston 85 is disposed about the lower end of the stem 81 of the operating member 80 and, as best shown in Figure 5, the piston 85 comprises a guide bushing 86 and a packing bushing 87 between which a leather 88 is disposed. Packing 89 is disposed closely about the lower end of the stem 81, and the piston 85 is free to shift longitudinally of the lower portion of the stem 81, being limited in its downward movement by its contact with the stop washer 83. A light spring 90 may be used to urge the piston 85 downwardly.

The upward movement of the free piston 85, which defines one wall of the metering chamber 26, is limited in an upward direction by an adjustable stop sleeve 91, the interior of which is formed with a relatively large pitch thread 92, the sleeve 91 being in threaded engagement with a nut member 93 welded or otherwise firmly fixed to the stem 81 of the operating member 80. The sleeve 91 extends outwardly of the closure plate 28 of the reservoir 27 through packing means 95, and similar packing means 96 is carried by the upper end of the sleeve 91 and disposed about the stem 81, as best shown in Figure 3. The packing 95 is larger than the packing 96 and, if necessary, is tighter than the packing 96 whereby rotating the knob 82 while holding the latter against longitudinal movement in either direction acts through the threaded nut 93 and the threads 92 to cause the sleeve 91 to be advanced longitudinally inwardly or outwardly of the metering chamber 26. The lower end of the sleeve 91 is adapted to be contacted by the piston 85 when the latter reaches an upward position, as will be clear from Figure 1, and rotating the operating member 80 in one direction or the other relative to the sleeve 91 while restraining longitudinal movement of the member 80, changes the position of the lower end of the sleeve 91 so as to vary the capacity of the metering chamber 26.

The operation of this form of the invention is substantially as follows.

Figure 1 shows the parts in the position they occupy when the valve 70 is in its neutral position. This is the position in which fluid is locked in the ram 5, in which case the rock shaft 13 and associated parts (Figure 1) are held in position, which may be in a completely raised position or in any one of a plurality of intermediate raised positions, depending upon how much oil was permitted to be withdrawn from the metering chamber 26 and forced by the pump 18 into the ram cylinder at high pressure. In this position of the valve 70, it will be noted that the cylindrical valve section 72 closes off the upper end of the cross bore 56, and the valve 52, being closed, also locks the fluid in the ram cylinder. If the operator should desire to lower the tools, he presses the operating member 80 directly inwardly, moving the same relative to the piston 85, because oil fills the metering chamber 26 below the piston. When the valve 70 is in its neutral position, oil is withdrawn from the inlet chamber 34 and the valve chamber 39 and passes through the pump 18, which is of a continuously operable type, the oil being discharged through the normally high pressure duct 37, the upper end of which opens directly back into the valve chamber 39, the entire circuit being under low pressure, as best shown in Figure 1. In this position of the valve, that is, the neutral position (Figure 1), the reservoir 27 is also in communication with the valve chamber 39 through the reservoir duct 67, 68, the cross bore 68 being so disposed, as best shown in Figure 1, that when the valve 70 is in a neutral position, the cylindrical section 71 thereof opens at least a portion of the reservoir duct 68 so that the latter is in communication with the valve chamber 39. Therefore, in the neutral position of the valve 70, the pump circulates oil that is in free communication with the supply of oil in the reservoir 27. This same idle circuit exists when the valve 70 is forced downwardly into its tool lowering position, as by the operator merely pressing downwardly on the knob. This forces the curved cam section 75 over the rounded end of the lowering valve stem 55, forcing the valve 52 to open and, at the same time, moving the valve section 72 downwardly to uncover the upper end of the port 56. Therefore, oil from the ram 5 is free to flow past the open valve 52 and up through the ducts 48 and 56, past the valve stem 77 and into the metering chamber 26. This flow of oil takes place due to the weight of the tool or tools and/or assisting spring means where necessary, and as the oil flows into the metering chamber 26 the piston 85 rises or moves upwardly in the cylinder until it engages the lower end of the adjustable stop sleeve 91. The piston 85 continues its movement, but since it is now in engagement with the sleeve 91, that is connected with the valve operating member 81, the upward movement of the piston 85 now serves to restore the valve 70 to a neutral position, which permits the lower valve 52 to close and also closes the bore 56. It will be noted, also, that at any time during the lowering action, the operator may terminate the same, regardless as to whether the free piston 85 comes into contact with the lower end of the sleeve 91, merely by pulling outwardly on the knob 82, which manually moves the valve 70 back into its neutral position. As mentioned above, by turning the knob 82 and shifting the latter to position the stop sleeve 91 in various positions, the amount of permissible lowering of the tools may be adjusted, as desired.

Assuming that it is desired to raise the tools, or extend the ram unit 5, whether from their completely lowered position or from an intermediate position, all the operator has to do is to pull out on the knob 82, thus raising the valve 70 into its raising position shown in Figure 5. It will be noted that in this position the cylindrical valve section 72 has been moved upwardly beyond the bore 56 and that the cylindrical valve section 71 has been moved upwardly into a position closing off the upper opening 41 and also closing off communication between the valve chamber 39 and the reservoir ducts 67, 68. Since the pump 18 continuously operates, oil is withdrawn from the metering chamber 26 down through the low pressure passageway 65 and into the lower end of the valve chamber 39, below the lower end of the cylindrical valve section 71. The oil then flows out through the lowermost opening 41 into the intake chamber 34, and from there it enters the pump 18, being forced outwardly of the latter under relatively high pressure into the discharge ducts 38, 37, the upper end of the latter leading back into the valve chamber 39 but on the upper side of the cylindrical section 71. From this portion of the valve chamber 39, the oil flows under pressure through the cross bore 56, the duct 48, forcing the valve 52 open against the spring 54. Thus, oil is forced under pressure back to the ram 5, extending the piston 7 and swinging the rock shaft in a counterclockwise direction (Figure 1). The operator may terminate the raising action at any time, merely by moving the knob 82 downwardly to dispose the valve 70 in a neutral position. However, the operator does not have to retain hold on the knob 82, for as the oil is withdrawn from the metering chamber 26 and forced by the pump 18 into the ram cylinder, the piston 85 follows the falling level of oil in the metering chamber 26 until the piston 85 engages the stop collar 83. Thereafter, a continued withdrawal of oil lowers the piston 85 and, by virtue of its contact with the stop washer 83, forces the valve 70 back from its raising position (Figure 5) into its neutral position (Figure 1). It will be noted that as the valve 70 moves from its upward position (Figure 5) back to its neutral position (Figure 1) the pump 18 stops pumping at about the time the valve section 71 starts to uncover the upper opening 41, since a direct connection is now established between the intake chamber 34 and the discharge bore 37 directly across the valve chamber 39. Therefore, the pressure falls and the pump can no longer do any work. The valve 70 tends to move downwardly under the action of gravity until its end 75 comes into contact with the inner end of the stem 55. However, there is no force available to force the valve 52 open, and hence it remains in its closed position.

If it should occur that, through leakage or the like, some liquid is lost from the system so that when the piston 85 moves downwardly its maximum amount the ram 5 has not been extended the desired amount, the system may be recharged in the neutral position of the valve by the operator grasping the valve 82 and pulling outwardly. Since the washer 83 is in contact with the lower portion of the piston 85, or substantially so, the operator lifts the piston 85 slightly. This alone tends to draw some liquid from the reservoir 27 past the leather 88 into the metering chamber 26, but in addition to this, the slight upward movement of the valve 70 causes the cylindrical section 71 to close off the upper opening 41, thereby interrupting the direct connection between the discharge and intake portions of the pump. Therefore, the operation of the pump draws oil from the metering chamber 26, and oil that is drawn therefrom is replaced by the suction in the chamber 26 pulling oil past the leather 88. Thus, as long as the operator holds the valve operating member 80 outwardly against the suction, oil is drawn from the reservoir 27 and forced to the ram 5. The operator may terminate the recharging action at any time merely by releasing his hold on the knob 82, whereupon the piston 85 engages the stop washer 83 and restores the valve 70 to its neutral or nonoperating position.

Figures 6, 11:
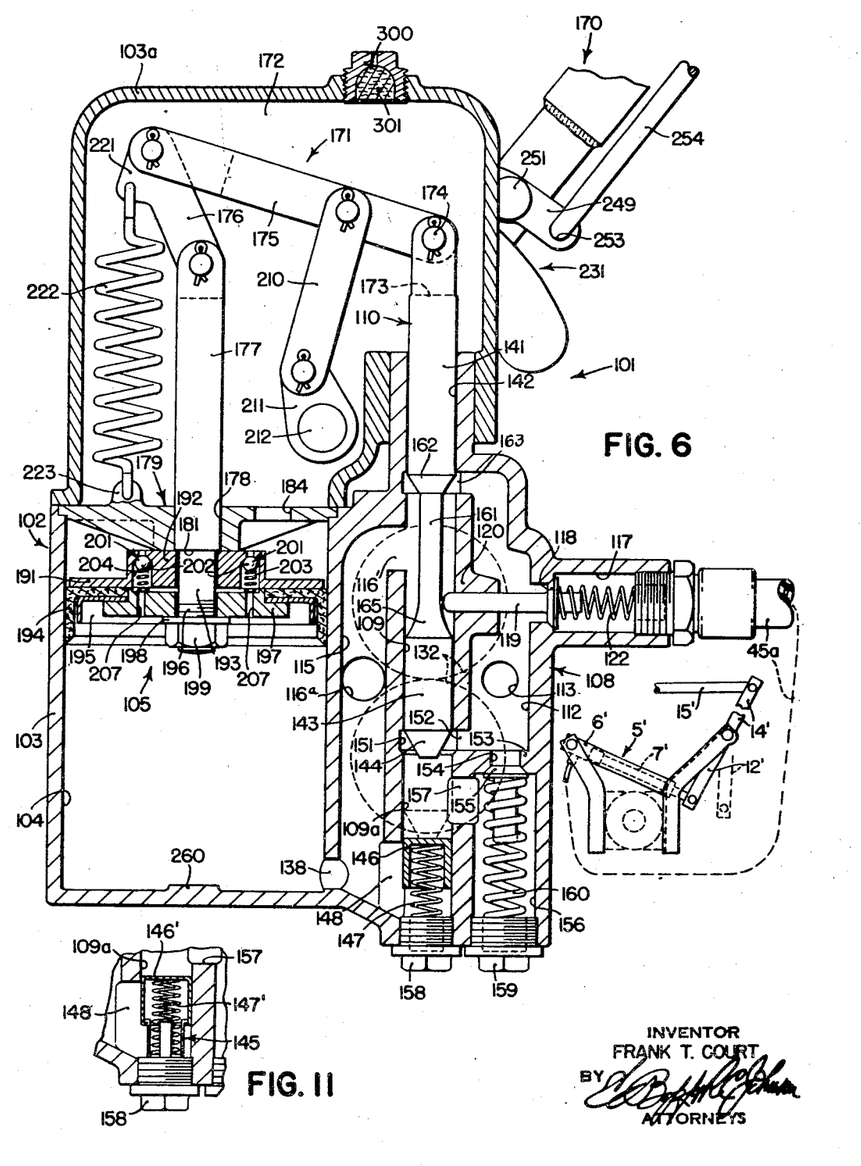
Figure 6 is a sectional view taken through a modified form of power lift hydraulic control unit.
Figure 11 is a modified form of lower valve, adapted for the modification shown in Figures 6 and 10.

Another form of the present invention, employing substantially the same type of valve mechanism and automatic cut-off described above and shown in Figures 1-5, is illustrated in Figure 6 et seq. In the first form of the invention, described above, the working ram unit 5 is extended or retracted by operating a valve controlling member, but once started in operation, the extension or retraction of the ram unit continues until the end of the cycle, which may be adjusted by disposing the stop sleeve 91 in different positions. In the modified form of the present invention, to be described below, a slightly different type of control is provided, in which a manually operated control part may be moved into any one of a variety of positions, the mechanism functioning to extend or retract the ram cylinder a proportional amount.

Figure 7:
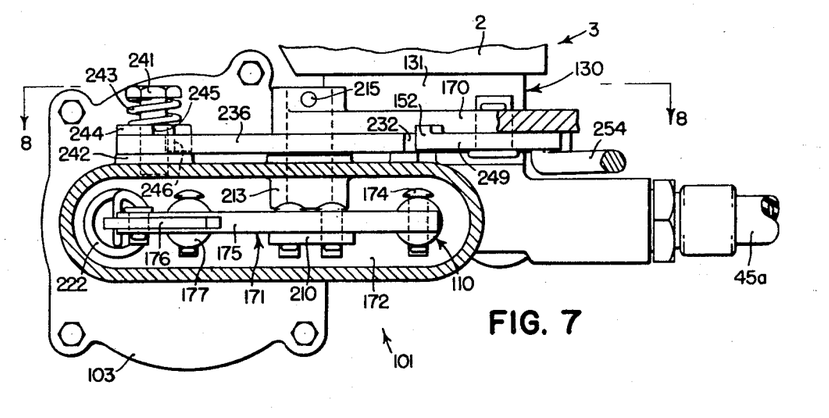
Figure 7 is a view, partly in section, taken generally along the line 7—7 of Figure 8.

Referring now to Figure 6 et seq. the reference numeral 101 indicates the hydraulic metering chamber and valve unit in its entirety, which unit may be secured to the tractor 3 by fastening the same to the governor housing 2 in substantially the same manner as shown in Figure 1. A hose 45a leads from the operating and control unit 101 to a working ram unit 5'. The unit 5' is substantially the same as the unit 5, hence the parts thereof have been indicated by the same reference numerals to which primes are added for distinction. The operating and control unit 101 comprises a casing 102 formed of a lower part 103 and an upper part or cover section 103a. The lower section 103 includes a metering or control chamber or cylinder 104 in which a piston 105 is movable. A valve chamber 108 is formed alongside the cylinder 104, being somewhat more narrow as shown in Figure 7. The valve chamber 108 includes a cylindrical bore 109 in which a valve member 110 is movable generally longitudinally. A high pressure or pump outlet passageway 112 communicates with the cylinder 109 through a port 163, and a low pressure or pump inlet passageway 115 communicates with the upper portion of the valve cylinder 109 through a port 116'. An outlet chamber 117 receives the hose 45a leading to the working ram and the outlet passageway 117 is controlled by a poppet valve 118 having a stem 119 that extends through a drilled passage in the wall 120 separating the high pressure passage 112 from the valve cylinder 109. The inner end of the valve stem 119 is adapted to be controlled by the valve 110, as will be described below, and a spring 122 acts against the valve 118 yieldingly urging the same toward its closed position.

The unit 101 includes a pump indicated in its entirety by the reference numeral 130 (Figure 7) and which includes a pump chamber 131 and a pair of gears 132 (Figure 6) adapted to be driven in any suitable manner by driving means that extends into the tractor governor housing 2. The discharge outlet of the pump is in communication with a cross bore 113 that extends into the high pressure passage 112 (Figure 6) and the intake of the pump is in communication with an intake or cross bore 116a that extends into the intake passage 115. The lower end of the latter connects with the lower end of the metering chamber through a port 138.

The valve 110 is a valve of the cylinder type, embodying an upper cylindrical section 141 which slides generally vertically in a sleeve section 142 carried at the upper end of the valve chamber or housing 108. The valve 110 also includes a second cylindrical section 143 which is shiftable vertically in the central portion of the valve cylinder 109, having a lower pointed end 144. A small piston 146 is slidable vertically in the lower portion 109a of the valve cylinder 109 and is biased for upward movement by a relatively stiff spring 147. The chamber 109a may communicate with the lower portion of the inlet passageway 115 through a port 148 which in the normal position of the parts is closed by the pressure control valve 146. The spring 147 preferably is arranged so that it does not expand farther than is shown in Figure 6. Hence, there is no tendency for the piston 146 to be forced upwardly by the spring beyond the position, just closing the port 148. If desired, however, an enclosing cage 145 may be provided, as is illustrated in Figure 11, in which both the spring and cage are free to follow the upward movement of the valve 110, whereas in Figure 6, the plunger 146 is free to follow the upward movement of the valve 110 and the spring 147 may or may not, depending on whether the spring remains or is fixed in the bottom of the chamber 109a, or is fixed to the plunger 146. The latter construction is preferable. In either form, the spring, 147 or 147', is compressed whenever the valve 110 is moved downwardly. Above the lower portion 109a of the valve cylinder 109, in which the cylindrical valve plunger 146 is disposed, is an annular chamber 151 which communicates through a bore 152 with the lower portion of the high pressure passage 112. The lower end of the latter is closed by a wall 153 in which a port 154 is formed. The lower portion of the port serves as a valve seat to receive a high pressure emergency relief valve 155. The valve 155 is normally held in closed position by a relatively strong spring 160 which is disposed in a spring chamber 156, the chamber 156 communicating with the lower portion of the valve chamber 109 through a port 157. The lower ends of the valve chamber 109 and spring chamber 156 are closed by screw threaded plugs 158 and 159, respectively. The valve 110, between the cylindrical sections 141 and 143 thereof, is reduced in diameter, as indicated at 161, the upper portion of the reduced shank 161 being connected with the upper section 141 by a tapered or conical portion 162 which is normally disposed in an annular chamber 163 leading into the upper end of the high pressure chamber 112. The lower end of the shank 161 is connected with the lower cylindrical section 143 by a portion 165 that is of curved or cam cross section, this being the portion that cooperates with the outlet valve stem 119, as will be described below in connection with the operation of the device.

The position of the valve 110 in the valve chamber 109 is controlled by linkage that differentially connects the piston 105 and an operating handle 170 with the valve, the linkage being indicated in its entirety by the reference numeral 171 and being disposed in an upper chamber 172 formed by the upper or cover section 103a of the unit 101. The upper end of the valve 110 extends out of the valve housing 108 and into the chamber 172, the upper end being bifurcated, as indicated at 173, and carrying a pin 174 to which one end of a lever 175 is pivotally connected. The other end of the lever 175 is connected by a link 176 with the upper end of a piston rod 177, the lower end of which passes through an opening 178 in a guide disk 179 which extends across the upper portion of the cylinder 104. The guide disk 179 is provided with a plurality of openings 184 so that there is a free flow of fluid between the cylinder 104, above the piston 105, and the chamber 172. The lower end of the rod 177 is provided with a shoulder 181 against which the piston 105 is disposed.

The piston 105 comprises a backing member 191 which is formed with a central boss section 192 apertured to receive the reduced end 193 of the piston rod 177. A piston leather 194 is disposed against the backing member 191 and is normally held with its edges against the walls of the cylinder 104 by a snap ring 195 or other suitable means. The end 193 of the piston rod 177 is threaded, as at 196, and over the threaded end is disposed a clamping plate member 197, the latter being held in place by a lock washer 198 and a clamping nut 199.

The piston 105 includes biased valve means providing for a replenishing flow of fluid into the space below the piston 105, and such valve means is indicated in its entirety by the reference numeral 201. The valve means comprises a plurality of valves, each of which includes a ball 202, a biasing spring 203, both being disposed in a bore 204 formed in the section 192 of the backing member 191. The clamping disk 197 serves to retain the springs 203 in position and is formed with a plurality of opening 207 which are in communication with the bores 204, whereby under conditions where replenishment is necessary, fluid may flow through the valves 202 and into the space below the piston 105.

Referring again to the linkage 171, the intermediate portion of the lever 175 is connected by a link 210 with an arm 211 fixed to a shaft 212, one end of which extends into the chamber 172. The shaft 212 is supported for rocking movement in a bearing boss 213 that extends into the casing 172, the outer end of the shaft 212 being fixed to the operating handle 170 by a pin 215 or other suitable means. The link 176 is formed with an apertured portion 221 to which the upper end of a spring 222 is connected. The lower end of the spring 222 is anchored to an apertured boss 223 provided on or carried by the guide disk 179.

As described above, the operating handle 170 is fixed to the outer end of the shaft 212. An adjustable sector 231 is pivotally mounted on the rock shaft 212 between the lever 170 and the adjacent side of the cover housing 103a. The sector 231 is formed with a notch 232 having diverging walls 234 and 235, and an extension 236 is carried by the sector and has a slot 237 that extends generally longitudinally of the extension 231. A cap screw 241 is threaded into an apertured boss 242 formed on one side of the cover 103a. A spring 243 is disposed under the head of the cap screw 241 and bears against a plate or disk 244 which is formed with a stop abutment 245 and an inwardly extending tongue or lug 246 that lies in the slot 237. The function of the tongue or lug 246 is to prevent the disk 244 from turning on the cap screw 241. Therefore the stop 245 is held in position. The sector 231 is extended, as at 236a, so that the detent 249, described below, never rides off the sector 231 in any position of the latter and the handle 170. A stop 247 is formed on or carried by the casing 103a to limit the rearward movement of the handle 170.

A pivoted detent dog 249 is swingably mounted on a pin 251 carried by the hand lever 170 and is provided with a detent section 252 at one end and an aperture 253 at the other end. A rod 254 has one end engaged in the aperture 253. The rod extends along the hand lever 170 and at its other end is threaded, as at 255, into a ball 256 that is mounted for sliding movement on the upper end of the hand lever 170. A spring 258 serves as biasing means for holding the ball in its outer position. When pressed inwardly, the ball acts through the rod 254 to swing the detent dog 249. Normally, the detent section 252 rides along the upper edge of the sector 231 and its extension 236, the detent section 252 being sufficiently wide to engage the lug 245 on the disk 244. The notch 232 and the stop lug 245 cooperate with the detent dog 252 for determining two end positions of movement of the hand lever 170, and this position may be adjusted when desired by engaging the detent section 252 in the notch 23 and then pulling outwardly on the ball 256 so as to hold the detent 249 against swinging movement. Then by shifting the handle in one direction or the other the sector remains locked to the handle and may be pivoted about the rock shaft 212 so as to bring the notch 232 closer to or further away from the cooperating stop lug 245. It will be noted that the spring 243 acts through the disk 244 for frictionally holding the sector 231 in a position in which it is set as in the manner just described.

The operation of this form of the invention is substantially as follows.

Figures 8, 9:
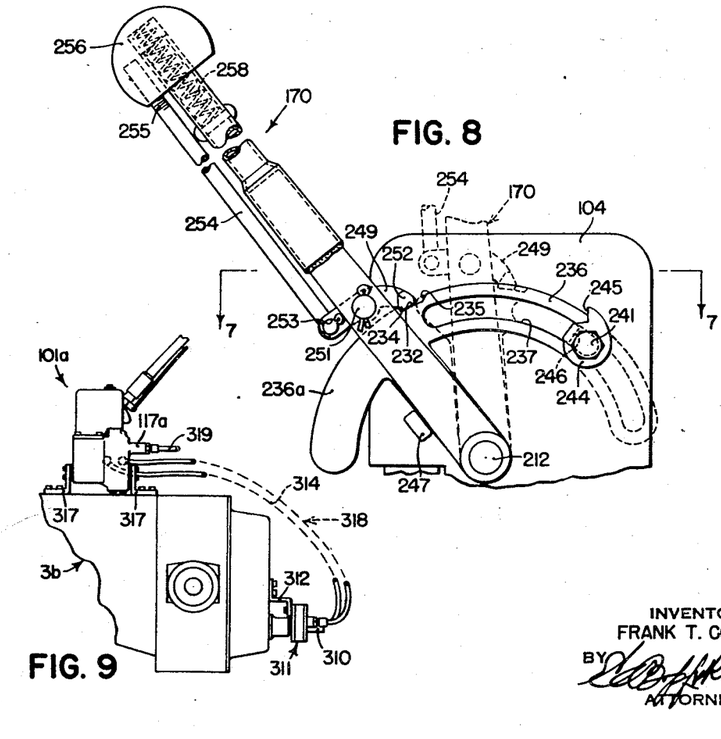

In the position shown in Figures 6 and 8, the sector 231 is set in a position for maximum lowering, and in Figure 6 the position of the metering or control piston 105 is that which it occupies when all of the oil in the ram cylinder has been returned to the control unit 101, which places the ram piston in its most retracted or maximum lowered position, as best shown in Figure 6. Assuming that the operator desires to raise the implement part to its fully raised position, the operator pushes forwardly on the control handle 170, in a counterclockwise direction as viewed in Figure 6 and in a clockwise direction as viewed in Figure 8. Since the cylinder or control chamber 104 is filled with oil, the forward movement of the handle 170 causes counterclockwise movement of the rock shaft 212 (Figure 6), the downward pull on the link 210 acting to swing the lever 175 in a clockwise direction about its pivotal connection with the upper end of the link 176. This moves the valve member 110 downwardly, which downward movement forces the plunger 146 down against the pressure of the spring 147, clearing the lower part 109a of the valve chamber 109 of oil. If the handle 170 is moved all the way forwardly, the lower end 144 of the valve moves down to approximately the position shown in dotted lines in Figure 6. The downward movement of the valve 110 causes the upper cylindrical portion 142 of the valve 110 to close off communication between the port 163 and the port 116'. A moment after this port is closed the lower cylindrical section 143 closes off the port 152 in the lower part of the high pressure chamber 112. The pump now begins to deliver fluid under pressure into the chamber 112 through the pump discharge port 113, and this causes oil to force the poppet valve 118 open and to flow through the hose 45a to the ram cylinder 6'. The oil that is pumped into the ram cylinder 6' is withdrawn from the control chamber 104, and as the oil is withdrawn the spring 222 causes the piston 105 to follow downwardly as the oil flows out of the chamber 104. This downward movement of the piston tends to swing the link 175 in a counterclockwise direction about its pivot connection with the upper end of the link 210, which would act to raise the valve 110. This upward movement of the valve 110, which begins immediately, accommodates the expansion of the spring 147 by an amount corresponding to the free length of the spring 147 (Figure 6), or corresponding to the movement permitted by the cage 145 (Figure 11). The further and continued upward movement of the valve 110 merely causes the piston 146 to follow the valve 110. Oil below the valve 110 therefore never interferes with movement of the valve.

Under the conditions assumed, wherein the operator moved the handle 170 to its forwardmost position, the downward movement of the piston 105 does not open the ports 163 and 152 until all of the oil has been withdrawn from the chamber 104 and the piston 7' of the ram unit 5' moved into its fully extended position, which corresponds to the position of the ram shown in Figure 1. As a matter of actual practice, as soon as the operator moves the handle 170 forwardly only a slight amount, the valve 110 closes the ports 163 and 152 so that the pump starts forcing oil under pressure to the ram even before the operator moves the lever 170 into its forwardmost position. It may be considered, therefore, that as the operator moves the handle 170 forwardly, the operation of the pump in withdrawing oil from the control chamber 104 causes the piston 105 to move downwardly, under the action of the spring 222, the downward movement of the piston and the forward movement of the control handle 170 occurring more or less simultaneously. However, so long as the handle 170 is ahead of the piston 105, the valve 110 will be held in its lower position and the ram will therefore receive oil under pressure from the pump, this action continuing until the piston 105 moves downwardly to the bottom of the control chamber, against the pad 260, at which time the disposition of the handle 170 with its detent dog 249 adjacent the stop lug 245 serves to cause the last part of the movement of the piston to the lower portion of the chamber 104 to move the valve 110 upwardly. As soon as the lower edge of the cylindrical valve part 143 starts to open the port 152, the upper port 163 being still closed, there is a rush of oil under normal or operating pressure from the high pressure chamber 112 into the chamber 109a underneath the valve 110. This pressure, which is limited by the spring 147 or 147', therefore acts immediately to complete the upward opening movement of the valve 110, moving the handle 170 back a slight amount. The completion of the valve opening movement by the normal working pressure in the system secures a positive and definite opening of the ports 163 and 152 for terminating the delivery of oil under pressure to the ram cylinder when the control piston 105 reaches a predetermined point.

It is to be noted at this time that if the operator does not desire to lift the tools to the maximum extent, he may lift them to any extent desired merely by moving the hand lever 170 forwardly out of its lowered position (full lines, Figure 6) into some intermediate position. If the control lever 170 is left in some intermediate position, the downward movement of the piston 105 as oil is withdrawn from the control chamber 104 and delivered by the pump under pressure to the ram cylinder, will raise the valve 110 back to its neutral position (Figure 6) at a point in the downward travel of the piston 105 that corresponds to the intermediate position in which the control lever 170 is disposed. Therefore at this intermediate point the pump will automatically stop delivering oil under pressure to the ram and will merely be driven idly. If the operator desires to raise the tools an additional slight amount, all that he has to do is to move the lever 170 forwardly a corresponding increment, the first movement of the lever 170 in a forward direction momentarily lowering the control valve 110, which initiates the delivery of oil under pressure to the ram, but as the oil is delivered the piston 105 moves downwardly and then will automatically terminate the delivery of oil under pressure to the ram in a second position corresponding to the new position to which the hand lever 170 moved. The present mechanism therefore functions as a servo-motor, having a part which may be moved through any number of steps and into an infinite variety of positions, the operating unit functioning to deliver oil under pressure to extend a ram by practically exactly corresponding amounts, the extension of the ram automatically terminating merely by leaving the handle 170 in any given or desired position. Ordinarily, however, for agricultural implement purposes, the tools usually are raised the maximum amount, which means that the control lever 170 will be thrown forwardly to its maximum extent, with the detent 249 in engagement with the stop lug 245.

It should also be noted at this point that, with the hand lever 170 left in, say, an intermediate position, the downward movement of the piston 105 as oil is withdrawn from the control chamber and delivered to the ram gradually raises the valve 110. The parts are so constructed and arranged that the lower portion of the cylinder section 141 starts to open the port 163 a slight distance after the cylindrical section 143 starts to open the lower port 152. That is to say, the downward movement of the piston 105 in causing the upward movement of the valve 110 first opens the lower port 152 while the upper port 163 is still closed. Since the discharge chamber 112 contains oil under pressure, just as soon as there is even a slight opening at the lower port 152, oil under pressure flows through such slight opening and into the space below the lower end 144 of the valve 110. There is created, therefore, below the valve 110 a zone of fluid under pressure which acts almost instantaneously to complete the upward movement of the valve 110, quickly opening the upper port 163 and thereby permitting the discharge of the pump to communicate directly with the intake. The space below the lower end 144 of the valve 110 is defined at its lower portion by the movable plunger 146. This member normally closes the port 148 that communicates with the intake of the pump and the lower portion of the control chamber 104, being held in this position by a spring 147. This spring is relatively light but is capable of exerting sufficient force so that the momentary surge of pressure through the slightly open port 152 is sufficient to complete the upward movement of the valve before the oil begins to flow through the space below the valve 110 and forces the plunger 146 downwardly, thereby opening the port 148 and permitting oil to flow directly from the discharge chamber 112 of the pump into the control chamber 104. The port 157 between the high pressure relief valve chamber 156 and the space below the valve 110 is so constructed and arranged that even in the lowermost position of the valve 110, there is always communication between the chamber 156 and the lower portion of the valve chamber 109. Therefore, if at any time during any part of the extension of the ram the latter should become jammed or there is for any reason excess pressure developed in the system, the relief valve 155 may open and divert such abnormal pressure through the chamber 156 and the port 157 into the space below the valve 110. This excess pressure immediately forces the plunger 146 downwardly, opening the port 148 and permitting the excess quantity of oil to flow into the chamber 104, thereby relieving such abnormal load. There may be no actual flow of oil into the chamber 104, since the opening of the emergency relief valve 155 and the downward movement of the plunger 146 merely places the discharge port 113 of the pump in direct communication, through the ports 157 and 148, with the intake 116a of the pump. The pump therefore idles and is not required to be driven under load.

The operation of lowering the tools will now be described. Lowering the tools requires that the oil that is locked in the ram cylinder and associated parts by the valve 118 be permitted to flow back to the control chamber 104. The valve 118 may be opened by swinging the hand lever 170 rearwardly, or to the right as viewed in Figure 6. This causes clockwise movement of the rock shaft 212, and since normally the left end (Figure 6) of the link 175 is held against upward movement by the spring 222, such clockwise movement of the arm 211 acts through the link 210 and the link 175 to raise the valve 110. This brings the curved or cam portion 165 of the valve 110 into action against the inner end of the stem 119, the upward movement of the valve 110 thus forcing the valve 118 open against the tension of the spring 122. However, when the valve 118 opens oil from the ram cylinder is then permitted to flow through the port 163 and the port 116' into the valve intake chamber 115, from whence it may flow into the control chamber 104 through the port 138. Normally, the path of movement of the oil as just described is adequate to conduct all oil from the ram cylinder into the control chamber. However, if there should be excessive load on the tools, the oil may flow downwardly through the port 152 and into the lower portion of the chamber 109, forcing the plunger 146 downwardly and opening the port 148, whereupon oil may flow from the discharge chamber 112 and join the oil entering the control chamber 104. As the oil flows into the control chamber 104 the piston 105 rises, and this upward movement acts through the link 175 to move the latter in a clockwise direction about its pivot connection with the upper end of the link 210, such movement tending to shift the valve 110 downwardly into its neutral position. However, the pressure of the spring 122 and the flow of oil past the valve 118 acts against the stem 119 to hold it quite firmly against the side of the valve 110, so that instead of the valve 110 moving downwardly the handle is caused to move downwardly as the piston 105 rises, since the resistance to movement of the handle in this direction is less than the resistance to the downward movement of the valve 110. Therefore, the lowering movement of the tools will continue until the handle is stopped in its movement. The handle may be stopped, however, by the operator grasping the same and momentarily holding it in position, but preferably the sector 231 is arranged so as to dispose the notch 232 in a position to be engaged by the detent dog section 252 at the desired lowered position of the tools, the last increment of raising of the piston 105 acting to move the control valve 110 back to its neutral position. This movement of the valve 110 by oil pressure and the corresponding movement of the lever 170 is accommodated by the length of the notch 232.

The walls of the notch 233 are arranged to be divergent so that the handle 170 may, if desired, be moved past the notch in either direction without interference, although when the detent engages in the notch, further movement of the handle by the oil entering under the piston 105 is effectively prevented. To secure this action, the tension of the spring 243 must create a holding force resisting displacement of the sector 231 that is greater than the tendency for the spring 258, holding the detent 252 in the notch 233, to cause displacement of the sector 231 when the handle is forcibly moved past the notch 233 in either direction.

The function of the spring 222 is two-fold. First, it acts to maintain the joints of the linkage 171 tight and takes out all slack, and furthermore, the spring 222 acts to hold the piston 105 down against the oil with a pressure that serves to hold the balls 202 up against the valve seats, thereby preventing oil from flowing from underneath the piston 105 up into the upper part of the unit 101 above the piston 105. This upper part of the unit 101 serves as a reservoir, and normally the oil level therein is high enough to maintain a substantial reservoir of oil. As in the form of the invention described above, the control chamber 104 and the cylinder of the ram unit, together with associated connections, form a closed hydraulic circuit. In the present construction, the oil in the control chamber and ram cylinder may be replenished by pushing down on the ball 256, which raises the detent out of engagement with the stop lug 245. Then the lever 170 may be moved forwardly an additional amount, which lowers the valve 110 and closes the ports 163 and 152. The pump therefore starts to withdraw oil from below the piston 105 and delivers it to the ram. However, since the control piston 105 cannot move downwardly any farther, oil is drawn past the leather 194 of the piston 105 from the quantity of oil above the piston 105, thus serving as an additional supply of oil which is directed to the ram by the operation of the pump so long as the handle 170 is moved forwardly past the lug 145 Therefore, as soon as the ram has been extended to the desired amount, the handle 170 is restored to its normal position and the delivery of oil to the ram cylinder is then terminated, and at the same time the system is replenished and is ready for normal operation. Not only is the oil drawn past the leather 194 as just described, but also oil flows past the valves 202.

The upper portion of the casing 103a is provided with a filler plug 300 of the filter type, including filtering means 301. This permits the oil level in the upper part of the unit 101 to rise and fall but without drawing in objectionable amounts of dirt and the like. By removing the plug 300 the oil in the upper part, or reservoir, of the unit 101 may be replenished from time to time as may be necessary. Also, the unit 101 may be charged in the first instance by having the piston 105 in its lowermost position in the chamber 104 and then pouring oil into the unit 101 through the hole in which the filler plug 300 is normally disposed. The springs 203 are chosen so that the additional head of oil causes the balls 202 to move away from their seats, and a quantity of oil, sufficient to prime the pump 132, flows through the piston valves 201 and fills the pump passages. The pump is started and then the handle 170 is swung rearwardly to move the valve 110 down to close off the ports 163 and 152. The pump will then draw oil from above the piston 105 past the leather 194 and the valve 202 and into the system. In initially charging the unit, it is preferable to hold the handle 170 in its forward position until, with the piston 105 in its lowered position, the ram is fully extended. This automatically charges the system with the correct amount of oil.

Figure 9 shows an optional arrangement in which the control unit is not necessarily fixed to the tractor so as to be operated by the governor mechanism but may be placed on the tractor in any suitable position, deriving its operating energy from a separate pump that may be driven from any suitable actuating part of the tractor and not necessarily from the governor mechanism, as in the arrangement shown in Figure 7. Referring now to Figure 9, the tractor is indicated at 3b and is of conventional construction. The tractor 3b includes a power take-off shaft 310, and a pump unit, indicated in its entirety by the reference numeral 311, is connected to the tractor, as by a connection 312 and supported so that the gears (not shown) of the pump 311 are driven by the shaft 310. A flexible hose connection 314 is connected to the inlet of the pump 311 and this hose extends upwardly and is connected to a hydraulic control unit 101a, which may be mounted on the tractor 3b in any suitable manner, as by brackets 317, and in any suitable location, as desired. Preferably, the hose 314 is connected to communicate directly with the inlet port of the pump, corresponding to the intake port 116 shown in Figure 6 for the unit 101. A second hose 318 is connected with the discharge port of the pump 310 and extends upwardly to the unit 101a and is in direct communication with the discharge port of the unit 101a, such port corresponding with the discharge port 113 shown in Figure 6. In other respects, the control unit 101a shown in Figure 9 is constructed exactly as shown and described above in connection with the control unit 101 shown in Figure 6, so that further description is unnecessary, except to say that a hose 319 is connected with the discharge chamber 117a of the unit 101a and leads to a ram unit (not shown) that may be located at any desired point, either on the tractor 3b or on an implement connected to or propelled thereby. The arrangement shown in Figure 9 may therefore be attached to any suitable tractor and may have the pump 311 driven from the tractor by any suitable manner, not only from the power take-off shaft 310 as illustrated, but also by some other connection, such as a belt pulley, or other shafting or gearing and the like. The pump 311 may be mounted on and driven from the implement, also.

Figure 10:
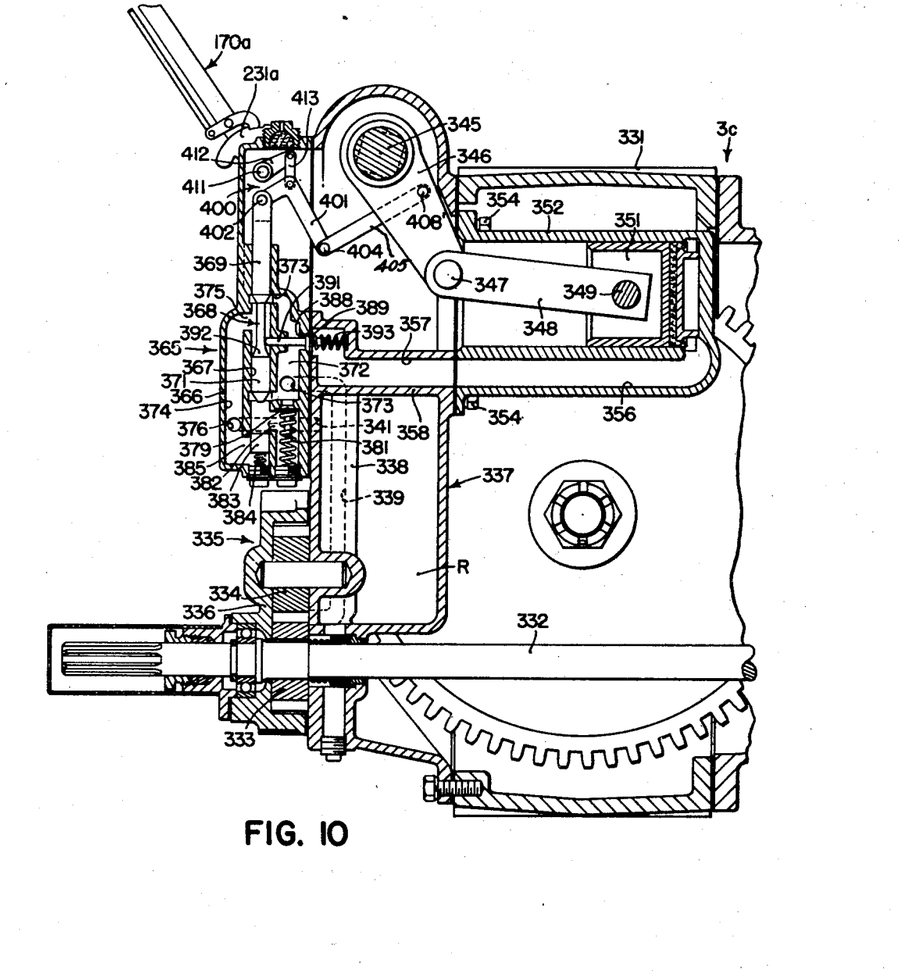
Figure 10 shows another modified form of the present invention in which the ram piston is connected directly with the valve controlling linkage.

Another form of the present invention is illustrated in Figure 10. In this form hydraulic control valve mechanism is employed which is substantially the same as shown in Figure 6 but the control chamber has been eliminated and the valve controlling linkage connected directly to the part that raises and lowers the implement tools. Referring now to Figure 10, it will be noted that the control mechanism of the present invention is illustrated as embodied in a tractor power lift similar to that shown in the patent to Elmer McCormick et al., No. 2,107,760, dated February 8, 1938, to which reference may be made if necessary. In this form of the invention the tractor is indicated by the reference numeral 3c, the tractor being represented largely by the banjo portion of the rear axle housing 331. The tractor 3c also includes a power take-off shaft 332 which drives the two gears 333 and 334 of a gear pump indicated in its entirety by the reference numeral 335. Preferably, the pump is constructed substantially as shown in the McCormick et al. patent, the pump gears 333 and 334 being disposed in a pump housing 336 that is bolted against the rear face of the power lift housing 337, the latter being fixed to and closing the rear opening of the rear axle banjo section 331. The power lift housing 337 is formed to include a reservoir R and a vertically extending cored section 338 in which a passage 339 is formed, the passage 339 communicating at its lower end with the high pressure side of the pump 335. A low pressure passage 341 leads from the reservoir R directly to the low pressure side of the pump 335, this construction being quite similar to that shown in the McCormick et al. patent.

The power lift housing 337 includes bearings (not shown) in which a lifting rock shaft 345 is supported for rocking movement, and fixed generally to the central portion of the rock shaft 345 is an arm 346 that extends in a generally downward direction and at its lower end is connected by a pivot pin 347 with a link 348, the forward end of the latter being pivoted, as at 349, to a piston 351 operating in a cylinder 352 bolted, as at 354, to the front side of the power lift housing 337. An opening in the front wall of the latter accommodates the disposition of the link 348 and its extension into the cylinder 352. The cylinder 352 communicates at its forward end with a passageway 356 that extends from the front end of the cylinder rearwardly, and the passageway 356 registers with a passageway 357 formed in a tubular portion 358 that extends across from the front wall to the rear wall of the power lift housing 337. Implement tools or other part or parts to be actuated are connected in the usual way with the ends of the rock shaft 345.

In this form of the invention the valve mechanism is indicated in its entirety by the reference numeral 365, the valve mechanism including a valve casing 366 having a cylindrical bore 367 in which a valve 368 is disposed for vertical movement. As in the form of the invention shown in Figure 6, the valve 368 includes an upper cylindrical section 369 and a lower cylindrical section 371, and the lower portion of the cylindrical valve receiving bore 367 communicates with the lower portion of an outlet or discharge high pressure chamber 372. This chamber communicates with the upper end of the high pressure passageway 339 through a bore 373. A low pressure passage 374 communicates with the upper portion of the cylindrical bore 367 through a port 375, and the lower portion of the low pressure passageway 374 communicates with the reservoir R through a bore 376 and the passage 341. A high pressure emergency relief valve 379 is constructed substantially like the safety valve 155 described above, the chamber 381 in which the valve 379 is disposed communicating with the space below the valve 368 through an elongated port 382. A plunger valve 383 backed by a relatively stiff spring 384 is disposed in the lower portion of the cylindrical valve receiving bore 367 and controls a port 385 which opens communication between the bores 367 and 374. The discharge chamber 372 is adapted to communicate with the passageway 357 through a valve controlled port 388. The valve is indicated at 389 and includes a stem 391 extending across the chamber 372 and into a position to be operated by the curved or cam section 392 of the valve 368. A spring 393 bears against the valve 389 and normally holds the same in closed position. The spring 384 may, if desired, be replaced by the type of preloaded spring shown in Figure 11.

The valve 368 is controlled by linkage which operates in substantially the same manner as the linkage 171 shown in Figure 6. The operating linkage for the valve 368, which is indicated in its entirety by the reference numeral 400, comprises a bell crank 401 pivoted at one end, as at 402, to the upper end of the valve 368. The other end of the ball crank, which is offset laterally to clear the bored part of the casing 366 in which the upper end of the valve 368 slides, is connected by a pivot pin 404 to a generally forwardly and upwardly extending link 405 that is pivoted at its forward end on a pin 408 on the power lift rock shaft arm 346. A hand lever 170a, of substantially the same construction as the hand lever 170 shown in Figure 6, is connected at its lower end to a rock shaft 411 that extends through the casing 366 and at its inner end receives an arm 412. The latter is connected by a link 413 to the lever 401.

It will be observed that the linkage just described is disposed in substantially the same relation as the linkage 171 shown in Figure 6, the principal difference being that in Figure 6 the linkage 171 connects a control piston 105 with the valve and operating handle, whereas in Figure 10 the linkage 400 connects the power lift arm 346 with the control handle 170a and the valve 368. In both forms, however, for any given position of the hand lever, 170 or 170a, a part movable in response to the extension of the associated ram unit serves to automatically return the valve to its neutral position. In Figure 6, the piston 105 normally moves with the extension of the ram, while in Figure 10 the rock shaft arm 346 moves in response to the extension of the ram. Both the piston 105 and the power lift rock shaft arm 346, as a matter of fact, move concomitantly with the tool or tools associated therewith.

The operation of the form of the invention shown in Figure 10 is substantially like that shown in Figure 6 and hence only a brief reference is believed to be necessary. The hand lever 170a is equipped with an adjustable sector 231a and associated parts which are constructed substantially exactly like the corresponding parts shown in Figure 7. When the hand lever 170a is moved, for example, in the raising direction, the valve 368 is lowered until the port 373 is closed, whereupon the pump delivers oil under pressure to the cylinder 352 through the passageways 357 and 356. The piston 351 moves outwardly in response to the delivery of oil to the cylinder 352, rocking the arm 346 and the rock shaft 345. The corresponding movement of the arm 346 acts through the linkage 400 to return the valve 368 to its neutral position. Therefore, as in the form of the invention shown in Figure 6, the hand lever 170a may be moved to any position along its sector and left in that position, and the operating mechanism will automatically rock the rock shaft 345 a corresponding amount, holding the rock shaft in a position corresponding to the position in which the hand lever 170a is left. Ordinarily, the hand lever 170a is moved into its fully raised position, which results in the power lift arm 346 swinging rearwardly the full extent before automatically returning the valve 368 to its neutral position. When lowering, the hand lever 170a is moved rearwardly, and the resulting forward swinging movement of the power lift arm 346 will automatically move the hand lever 170a rearwardly until its detent engages the associated notch in the sector 231a. The position of the sector 231a may be adjusted in substantially the same manner as described above in connection with the sector 231.

While I have shown and described above the preferred means in which the principles of the present invention have been incorporated, it is to be understood that my invention is not to be limited to the particular means shown and described above, but that, in fact, widely different means may be employed in the practice of the broader aspects of my invention.

What I claim, therefore, and desire to secure by Letters Patent is:

1. In an agricultural machine, power lift mechanism comprising a ram unit including a ram cylinder, a power driven pump, a chamber, fluid connections between said pump, chamber and ram cylinder, valve means controlling the flow of fluid through said connections, and movable into a position for accommodating a flow of fluid from said ram cylinder to said chamber, means operatively connected with said valve means for manually shifting the latter, and means in said chamber responsive to the quantity of fluid in said chamber and reacting against said manually shiftable means for moving said valve means into a position terminating said flow.

2. Hydraulic power lift mechanism for agricultural implements and the like, comprising a working ram unit including a cylinder and a piston therein, a fluid pump, a metering cylinder, operative connections between said pump, metering cylinder and ram cylinder, a valve controlling said connections and movable in one direction from an intermediate position locking fluid in said ram cylinder and movable in the other direction from said intermediate position, a movable piston in said metering chamber and defining one wall thereof, said piston moving to different positions in the metering cylinder in response to the quantity of fluid therein, manually operable means for shifting said valve means in either direction from said intermediate position, and means responsive to movement of the piston in said metering cylinder for shifting said manually operable means and said valve means into an intermediate position from either of their other positions.

3. In a hydraulic system, a single acting ram unit including a cylinder and a piston movable therein in response to flow of fluid into and out of one end of said cylinder, valve means controlling the flow of fluid to and from said end of said cylinder, a metering device including a chamber having a movable wall, a pump having a suction inlet and a pressure outlet, fluid connections extending between said pump inlet and said cylinder and valve, fluid connections extending between said pump outlet and said valve and cylinder end, and a follow-up linkage acting between said valve and said movable wall, whereby said pump may be operated for withdrawing liquid from said end of said cylinder and directing it to said metering chamber, and in another position of said valve the pump may be operated to draw liquid from said metering chamber and direct the same into said one end of said cylinder.

4. In a hydraulic system, a pump of the constantly driven type having an inlet and an outlet, a ram adapted to receive fluid from said pump, a chamber for supplying fluid to the inlet of said pump, and adapted to receive fluid from said ram, valve means movable from a neutral position, in which said pump is by-passed to said chamber, into a position for controlling the flow of fluid from the ram to said chamber, means for moving said valve means into said one operative position, and means responsive to the flow of a given quantity of fluid to said chamber for moving said valve means from said one operative position into its neutral position.

5. In an agricultural implement having a part to be shifted from one position into a number of other positions, a working ram unit for controlling the position of said implement part and including a cylinder and a piston movable therein, a fluid pump, a metering cylinder having a piston movable therein and defining one wall of a metering chamber formed by the metering cylinder, connections between said metering chamber, said fluid pump and said ram cylinder to accommodate a flow of fluid from the metering chamber through the pump and into the ram cylinder and a flow of fluid from the latter back to said metering chamber, valve means movable from an intermediate position, in which fluid is locked in said ram cylinder to hold said ram piston in a given position, into either of two terminal positions, one of which accommodates a flow of fluid from said metering chamber to said pump whereby the latter directs the fluid into said ram cylinder to extend the ram piston, the other terminal position of the valve means accommodating a flow of fluid from said ram cylinder back to said metering chamber to provide for inward movement of the ram piston and a corresponding movement of the implement part connected therewith, a manually controllable part movable into different positions corresponding to the different positions in which the ram piston and implement part may be moved, and a linkage connecting said manually movable means and said valve means and metering chamber piston, whereby movement of said manually controllable part into any one of its positions first controls said valve means to provide for movement of the ram piston in the desired direction, the corresponding flow of fluid to and from the metering chamber causing the piston therein to move a corresponding amount, movement of said metering chamber piston acting through said linkage for restoring said valve means to its intermediate position upon the completion of the desired movement of the ram piston.

6. In a hydraulic system, a chamber, a fluid pump, a working ram unit having a ram cylinder and a ram piston movable therein, a valve controlled passageway from said ram cylinder to said chamber including a check valve, a valve controlled passageway leading from the discharge side of said pump around to the intake side thereof and communicating with said chamber, a shiftable valve member controlling said first two mentioned passageways whereby in one position of the valve member fluid under pressure is forced past said check valve into said ram cylinder and movement of said valve member in the other direction opening said second passageway and closing said first passageway, whereby fluid circulates in an idle circuit through said pump in communication with the chamber, and means responsive to the quantity of liquid in said chamber for controlling said shiftable valve member.

7. A hydraulic system comprising a working ram unit including a ram cylinder and a piston movable therein, a pressure increasing device, a metering chamber having a piston movable therein and defining one wall thereof, valve controlled ports connecting said pressure increasing device, ram cylinder and metering chamber, valve means controlling said ports and movable into one position in which fluid is withdrawn from said metering chamber and delivered under pressure to said ram cylinder and movable into another position in which fluid flows from said ram cylinder back to said metering chamber and by-passing said pressure increasing device, whereby fluid from said ram cylinder flows back into said metering chamber, said valve means being movable into a third position in which fluid is locked in said ram cylinder, thereby holding the piston thereof in extended position, means for moving said valve means out of said intermediate position into either of its other positions, and means responsive to movement of the piston in said metering chamber in response to flow of fluid from said chamber or back to said chamber for automatically shifting said valve means from its other positions, respectively, back to said intermediate position.

8. In a hydraulic system for actuating a driven part and including a ram unit and a power driven pump adapted to deliver fluid under operating pressure to said ram unit, the combination of a control valve movable concomitantly with and proportionately to movement of said driven part, and means including a spring pressed plunger movable into a biased position by operation of said pump before said valve is moved into a neutral position for completing the movement of said valve in one direction.

9. In a hydraulic system, a cylinder, a piston movable therein, a pump for directing fluid under pressure to said cylinder, a valve chamber, valve means therein controlling the flow of fluid to and from said pump and cylinder, a low pressure chamber for supplying fluid to said pump, there being means including a port connecting said valve chamber and said low pressure chamber, and yielding by-pass means, including a second valve yieldably mounted in a position spaced from said valve means and adapted to yieldably close off said port, movement of said valve means in a direction toward said second valve serving to act through the fluid intervening therebetween to shift said second valve and open said port whereby fluid in said valve chamber may be discharged into said low pressure chamber to accommodate movement of said valve means, said by-pass means being free to move with said valve means in the other direction.

10. A hydraulic system comprising a working ram unit, a metering chamber having a piston movable therein and serving as a movable wall of said metering chamber, a fluid pump adapted to withdraw fluid from said metering chamber and direct the same under pressure to said ram unit, a reservoir above said piston, and check valve means carried by said piston and normally closed against the flow of fluid from said reservoir into said metering chamber, said check valve means opening to provide for said pump withdrawing fluid from said reservoir past said check valve means when the metering chamber piston reaches the end of its movement.

11. In an agricultural machine, power lift mechanism comprising a ram unit including a ram cylinder, a power driven pump, a low pressure chamber, fluid connections between said pump, chamber and ram cylinder, valve means controlling the flow of fluid through said connections, and movable into a position for accommodating a flow of fluid from said ram cylinder to said chamber, means responsive to the quantity of fluid in said chamber for moving said valve means into a position terminating said flow, a control lever, and means connecting the latter with said responsive means and said valve means.

12. A hydraulic system comprising a working ram unit including a ram cylinder and a piston movable therein, a pressure increasing device, a low pressure chamber, valve controlled ports connecting said pressure increasing device, ram cylinder and chamber, valve means controlling said ports and movable into one position in which fluid is withdrawn from said chamber and delivered under pressure to said ram cylinder and movable into another position in which fluid flows from said ram cylinder back to said chamber and by-passes said pressure increasing device, said valve means being movable into a third position in which fluid is locked in said ram cylinder, thereby holding the piston thereof in extended position, means for moving said valve means out of said third position into either of its other positions, and means movable in response to changes in the quantity of fluid in said chamber and connected with said valve means for shifting the latter automatically into its third position from said other position.

13. A hydraulic system comprising a working ram unit including a ram cylinder and a piston movable therein, a pressure increasing device, a metering chamber having a piston movable therein and defining one wall thereof, valve controlled ports connecting said pressure increasing device, ram cylinder and metering chamber, valve means controlling said ports and movable into one position in which fluid is withdrawn from said metering chamber and delivered under pressure to said ram cylinder and movable into another position in which fluid flows from said ram cylinder back to said metering chamber and by-passing said pressure increasing device whereby fluid from said ram cylinder flows back into said metering chamber, said valve means being movable into a third position in which fluid is locked in said ram cylinder, thereby holding the piston thereof in extended position, means for moving said valve means out of said third position into either of its other positions, and means responsive to movement of the piston in said metering chamber in response to flow of fluid to said chamber from said ram cylinder and adjustably connected with said valve means for shifting the latter automatically into its third position from said other position when a given quantity of fluid has entered said metering chamber, said quantity varying according to the adjustment of said responsive means.

14. In an agricultural machine having a part to be shifted from one position to another, a hydraulic ram connected with said part to shift the same, means for supplying fluid under pressure to said ram to extend the latter and shift said part in one direction, means providing for the flow of fluid out of said ram and the retraction of the ram to shift said part in the other direction, valve means shiftable to control the flow of fluid between said two means and said ram, a second part movable in accordance with the movement of said first part, manual control means connected differentially with said second part and said valve means whereby continuous or interrupted movement of the latter effects continuous or interrupted movement, respectively, of said first part, means whereby when fluid flows from said ram said valve means is held against movement and said manual control means is moved by the action of said differential connection, and mechanism for restricting further movement of said manual control means, whereby said differential connection acts to shift said valve means.

15. The invention set forth in claim 14, further characterized by means for adjusting said mechanism so as to change the point at which restriction to further movement of said manual control means is encountered.

16. In a hydraulic system, a chamber, a fluid pump, a working ram unit having a ram cylinder and a ram piston movable therein, a valve controlled passageway from said ram cylinder to said chamber, a valve controlled passageway leading from the discharge side of said pump around to the intake side thereof and communicating with said chamber, means including a check valve placing said last mentioned passageway in communication with said ram cylinder, a shiftable valve controlling said first two mentioned passageways whereby in one position of the valve member fluid under pressure is forced past said check valve into said ram cylinder and movement of said valve member in the other direction opening said second passageway and closing said first passageway, whereby fluid circulates in an idle circuit through said pump in communication with the chamber, an additional movement of said shiftable valve member in said other direction serving to open said check valve while leaving said second valve controlled passageway open, and means responsive to the quantity of liquid in said chamber for controlling said shiftable valve member.

17. In an agricultural machine, power lift mechanism comprising a ram unit including a ram cylinder, a power driven pump, a chamber, fluid connections between said pump, chamber and ram cylinder, valve means controlling the flow of fluid through said connections, and movable from a neutral position into one position for accommodating a flow of fluid from said ram cylinder to said chamber and into another position providing for a flow of fluid from said chamber through said pump to said ram cylinder, means operatively connected with said valve means for manually shifting the latter from said neutral position to said one position and to said other position, optionally, and means in said chamber responsive to changes in the quantity of fluid in said chamber and reacting against said manually shiftable means for moving said valve means back to said neutral position from either said one position or said other position.

FRANK T. COURT.

REFERENCES CITED

The following references are of record in the file of this patent:

UNITED STATES PATENTS

| Number | Name | Date |
|---|---|---|
| 1,017,557 | Kieser | Feb. 13, 1912 |
| 1,855,434 | Vickers | Apr. 26, 1932 |
| 2,229,561 | Galanot | Jan. 21, 1941 |
| 1,907,208 | Lebel | May 2, 1933 |
| 1,775,856 | Hauser | Sept. 16, 1930 |
| 2,114,157 | Towson | Apr. 12, 1938 |
| 2,229,530 | South | Jan. 21, 1941 |
| 2,311,516 | Brown | Feb. 16, 1943 |
| 2,243,364 | Trautman | May 27, 1941 |
| 2,293,071 | Morgensen | Aug. 18, 1942 |
| 1,016,573 | Maddox | Feb. 6, 1912 |
| 2,072,088 | Dysart | Mar. 2, 1937 |
| 1,806,136 | Weiss | May 19, 1931 |
| 1,968,422 | Proctor | July 31, 1934 |
| 1,940,508 | Proctor | Dec. 19, 1933 |
| 2,264,560 | Albertson | Dec. 2, 1941 |
| 1,897,386 | Ferris | Feb. 14, 1933 |
| 1,058,271 | Sundh | Apr. 8, 1913 |
| 1,206,707 | Hunter | Nov. 28, 1916 |
| 2,114,005 | Tyler | Apr. 12, 1938 |
| 2,342,450 | Campbell | Feb. 22, 1944 |
| 2,165,966 | Hall | July 11, 1939 |
| 2,192,963 | Davis | Mar. 12, 1940 |
| 1,955,154 | Temple | Apr. 17, 1934 |

FOREIGN PATENTS

| Number | Country | Date |
|---|---|---|
| 558,460 | Great Britain | 1944 |